United States Patent [19]
Blanchard et al.

[11] Patent Number: 6,072,986
[45] Date of Patent: Jun. 6, 2000

[54] METHOD OF IDENTIFYING ANTENNA BEAMS FOR TRANSMISSION OF RING ALERT MESSAGES

[75] Inventors: Scott David Blanchard, Mesa; Dean Paul Vanden Heuvel, Chandler; Joseph Olk Lester, Mesa, all of Ariz.

[73] Assignee: Motorola Inc., Schaumburg, Ill.

[21] Appl. No.: 08/903,693

[22] Filed: Jul. 31, 1997

[51] Int. Cl.⁷ .............................. H04B 7/185; H04B 7/00
[52] U.S. Cl. ..................... 455/13.4; 455/13.3; 455/38.3
[58] Field of Search .................. 455/13.2–13.4, 455/25, 12.1, 38.3, 427–429, 445, 574, 440, 435, 343, 13.1, 33.1–33.3, 54.1–54.2; 342/352, 354; 379/59

[56] References Cited

U.S. PATENT DOCUMENTS

| | | | |
|---|---|---|---|
| 5,223,843 | 6/1993 | Hutchinson | 455/12.1 |
| 5,463,400 | 10/1995 | Tayloe | 342/352 |
| 5,537,681 | 7/1996 | Redden et al. | 455/428 |
| 5,539,921 | 7/1996 | Tayloe | 455/13.4 |
| 5,552,795 | 9/1996 | Tayloe et al. | 455/456 |
| 5,563,606 | 10/1996 | Wang | 455/13.3 |
| 5,710,805 | 1/1998 | Armbruster et al. | 455/435 |
| 5,732,387 | 3/1998 | Armbruster et al. | 455/13.2 |
| 5,809,396 | 9/1998 | Armbruster et al. | 455/12.1 |

*Primary Examiner*—Curtis A. Kuntz
*Assistant Examiner*—George Eng
*Attorney, Agent, or Firm*—Gregory J. Gorrie

[57] ABSTRACT

In a global satellite communication system (10) that provides antenna beams that move with respect to Earth's surface, gateways (22) send ring alerts directed to subscriber units (26) based on a list of antenna beams. The list of antenna beams is determined by a dot product between a subscriber unit's basis vector and antenna beam vectors. Ring alerts are transmitted in antenna beams when the dot product exceeds a predetermined threshold. Subscriber units listen for ring alerts in the same antenna beams of the list by calculating the list the same way the gateway calculates the list.

23 Claims, 3 Drawing Sheets

METHOD OF IDENTIFYING ANTENNA BEAMS FOR TRANSMISSION OF RING ALERT MESSAGES

FIELD OF THE INVENTION

The present invention relates generally to cellular communication systems that broadcast within multiple antenna beams and communicate with users located within individual beams. More specifically, the present invention relates to satellite communication systems that transmit pages and ring-alert messages within multiple antenna beams.

BACKGROUND OF THE INVENTION

Cellular communication systems ring called parties by sending ring-alert messages on a cell's broadcast channels. Ring-alert messages are directed to particular subscriber units. Subscriber units monitor broadcast channels to determine when a ring-alert message is directed to a particular subscriber unit.

In cellular systems, ring-alerts are generally broadcasted in all cells of an entire geographic region where the called-party may reside. Broadcasting each ring-alert within each cell requires a certain amount of additional energy. In terrestrial cellular systems, there is no need to conserve energy because the energy supply is virtually unlimited.

However, in a satellite communication system, where subscriber units receive ring-alerts from satellite communication nodes, it is desirable to conserve energy by broadcasting ring-alerts in as few cells or antenna beams as possible, since a satellite's energy supply is extremely limited. A satellite's power is generally limited to that supplied by its solar panels and its batteries. Energy expended for ring-alerts reduces the amount of energy available for other communications.

A global satellite telecommunication system, to establish a wireless communication link with subscribers located anywhere in the world, the antennas on the satellites should cover the entire earth with sufficient antenna gain to establish the communication link. When contact is desired with a subscriber unit, the telecommunication system sends the subscriber the ring alert message to alert him that he has an incoming call. If the ring alert message is sent out over all antenna beams in the system, then the message is almost guaranteed to reach the subscriber, since the system antenna footprints cover the entire earth's surface. Sending the message in all antenna beams, however, makes inefficient use of system resources such as the bandwidth available for the ring alert messages, in addition to power discussed above.

Furthermore, in non-geo-synchronous multi-beam satellite communication systems, is extremely difficult to send ring alerts to a large number of mobile subscriber units because the location of a satellite's antenna beams is continually changing with respect to the earth's surface. This is true even though the locations of the mobile subscriber units can be provided to the satellite. This problem increases substantially when the satellites are in a low-earth orbit (LEO) because the relative velocity between the satellite and the subscriber unit is significant.

Ring-alerts and pages are desirably directed within the proper antenna beam of the proper satellite in a time-efficient manner to provide satisfactory service to users placing calls, and to conserve satellite energy.

Thus it is desirable to send ring alert messages to a smaller subset of the system antenna beams that the ring alert message can be sent to conserve bandwidth resources. It is also desirable to send ring alert messages to a smaller subset of system antenna beams with a high probability of contacting the subscriber unit.

Thus what is needed is an improved method of sending a ring alert to a subscriber unit. What is also needed is method of sending ring alerts to subscriber units that reduces processing power and conserves energy a the subscriber unit. What is also needed is a method of sending ring alerts to subscriber units that reduces the number of registrations performed by a subscriber unit. What is also needed is a method of sending ring alerts to a subscriber unit that improves likelihood that the subscriber unit will receive the ring alert. What is also needed is method of sending ring alerts to subscriber units that reduces use of system bandwidth while having a higher probability of reaching the subscriber unit.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a method of sending ring alerts and pages to a subscriber unit. The method includes the steps of a gateway retrieving a basis vector for the subscriber unit and identifying a region on Earth's surface. The method also includes determining a dot product between the basis vector and antenna beam vectors and adding antenna beams to a list when the dot product exceeds a threshold. The gateway transmits ring alerts to the subscriber unit on beams that are on the antenna beam list.

The present invention also provides a method of receiving ring alerts by a subscriber unit wherein a subscriber unit has a basis vector that identifies a region on Earth's surface. The subscriber unit performs a dot product between the basis vector and antenna beam vectors of the communication system and adds antenna beam vectors to its antenna beam list when the dot product exceeds the threshold. The subscriber unit monitors the broadcast channels of the antenna beams on this list for ring alerts directed to the subscriber unit.

The present invention, in the preferred embodiments, improves system capacity and bandwidth by sending ring alert messages to a smaller subset of antenna beams.

Accordingly, the number of subscriber units that can be rung is increased. Additionally, because of the way the subset of antenna beams is calculated, there is an improved probability that a subscriber unit will receive these ring alert messages.

The present invention reduces subscriber unit cost and improves subscriber unit battery life by using less processing power and reducing the number of re-registrations required by a subscriber unit. The present invention also reduces the processing required by satellites and gateways. The communication system rings the antenna beams that the subscriber unit is listening to. In the preferred embodiment, the information used in calculating the antenna beams used by the gateway is the same method preferably used by the subscriber unit. In accordance with the preferred embodiment, when the subscriber unit does not monitor the correct beam, it registers with the system which updates the location of the subscriber unit so that the communication system broadcasts ring alerts on the proper antenna beams.

Accordingly, quality of service is improved by reducing the probability of missed calls and pages. As compared to typical methods where a subscriber unit estimates its location, the present invention reduces the number of beams for which ring alerts are transmitted. Furthermore, the need to ring guard beams is reduced or eliminated since the subscriber unit re-registers with the system when it does not monitor the beams for which the system transmits ring alerts. As a result, power consumption for broadcast channels is reduced. Another advantage to the present invention is that the number of registration requests is reduced because the subscriber unit registers when it does not monitor the proper antenna beams. This is not the case for location based registration methods which result in more unnecessary registration requests.

A "satellite" is defined herein to mean a man-made object or vehicle intended to orbit earth and includes both geostationary and orbiting satellites and/or combinations thereof including low earth orbiting (LEO) satellites. Ring alerts as used here include any messages directed to a subscriber unit and include pages. As used herein the terms "cell" and "antenna beam" are not intended to be limited to any particular mode of generation and include those created by either terrestrial or satellite cellular communications systems and/or combinations thereof. The present invention is applicable to systems including satellites having low-earth, medium-earth and geo-synchronous orbits. Additionally, it is applicable to orbits having any angle of inclination (e.g., polar, equatorial or other orbital pattern).

Figure 1:
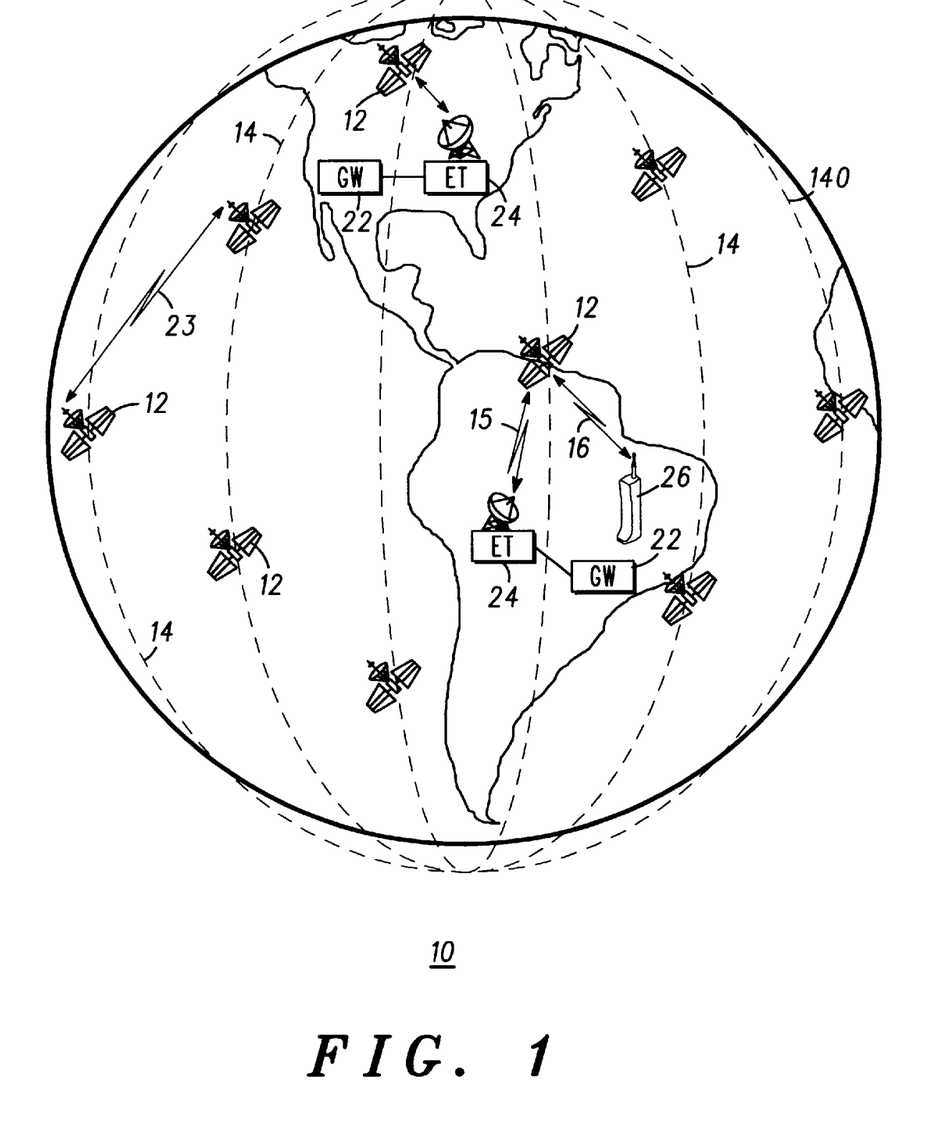
FIG. 1 illustrates a highly simplified diagram of a satellite-based communication system with which the present invention may be practiced.

FIG. 1 illustrates a highly simplified diagram of satellite-based communication system 10 with which the present invention may be practiced. Communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few satellites 12.

Satellites 12 communicate with terrestrial stations which may include some number of radio communication subscriber units (SUs) 26 and earth terminals (ETs) 24. ETs 24 are preferably connected to gateways (GWs) 22, which provide access to the public switched telephone network (PSTN) or other communications facilities. Only one each of GWs 22 and SUs 26 are shown in FIG. 1 for clarity and ease of understanding. ETs 24 receive data describing tracking of satellites 12 and relay packets of control information. ETs 24 also relay data packets relating to ring alerts, pages, calls in progress and other messages to and from subscriber units to GWs 22.

SUs 26 may be located anywhere on the surface of the earth or in the atmosphere above the earth. SUs 26 are preferably communications devices capable of transmitting data to and receiving data from satellites 12. By way of example, SUs 26 may be hand-held, portable cellular telephones, pagers or other communication devices adapted to communicate with satellites 12. Ordinarily, SUs 26 need not perform any control functions for communication system 10. Subscriber units, among other things, perform processes described below.

Communication system 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels.

As a minimum, a satellite 12 continuously transmits over one or more broadcast channels. Subscriber units 26 synchronize to broadcast channels and monitor broadcast channels to detect data messages which may be addressed to them. These data messages include both ring-alerts which notify a subscriber unit that another party desires communication, as well as pages which may deliver specific messages. In the preferred embodiments, subscriber units perform processes for registration with the system and determining antenna beams for which to receive ring-alerts and pages.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22. In a preferred embodiment, GWs include access to data storage which contain information on subscriber unit, including information identifying the location of subscriber units. GWs preferably perform processes to identify antenna beams and send ring-alerts to subscriber unit in response to incoming calls. This is discussed below.

Figure 2:
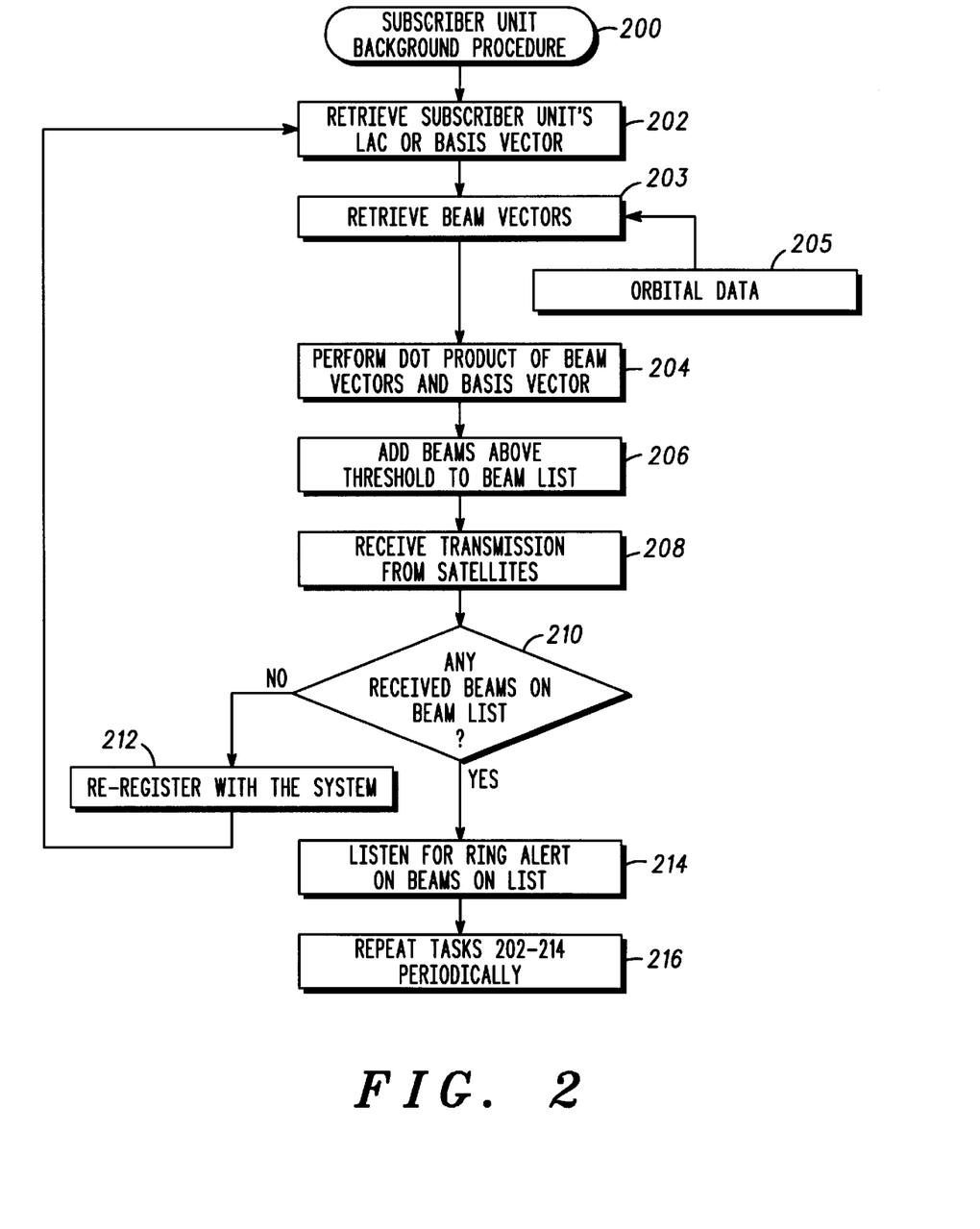
FIG. 2 illustrates a flow chart of a procedure performed by a subscriber unit for determining antenna beams to monitor for receipt of ring alerts in accordance with a preferred embodiment of the present invention.

FIG. 2 illustrates a flowchart of a procedure performed by a subscriber unit for determining antenna beams to monitor for the receipt of ring alerts in accordance with the preferred embodiment of the present invention. Procedure 200 is a background procedure performed by subscriber units, preferably on a substantially continuous basis. One purpose of procedure 200 is the subscriber unit selection of antenna beams to monitor for ring alert messages. In accordance with procedure 200, a subscriber unit determines a list of antenna beams for which to listen for ring alerts directed to the subscriber unit. Preferably procedure 200 is performed by subscriber unit 26 (FIG. 1).

In task 202, the subscriber unit retrieves a basis vector stored in it is memory. A portion of this basis vector preferably includes position information. The position information, for example, may represents a position on Earth's surface that the subscriber unit was located when it last re-registered with the system. In one embodiment of the present invention, the position information is associated with a location area code (LAC) which identifies predetermined geographic region on Earth's surface. This basis vector is stored in the subscriber unit during the process of registering with the communication system.

In one preferred embodiment, the basis vector includes information such as previous channel information, age of the data, and/or frequency information. In a CDMA system, the basis vector may include coding information. In this embodiment, the positional information does not have to be included in the basis vector.

In task 203, the subscriber unit retrieves orbital data 205 on the communication system. This orbital data preferably includes antenna beam vectors for the antenna beams of the communication system. These antenna beam vectors may be represented as beam centers on the Earth in a Earth center, Earth fixed coordinate system. Alternatively the beam vectors may be represented as a bore site or center of the beam and where a satellite is the center of the coordinate system.

In task 204, the subscriber unit combines the beam location information from task 203 with the subscriber unit basis information from task 202 to arrive at a value for each antenna beam. Preferably, in task 204, a subscriber unit performs a dot product of the beam vectors of task 203 and the basis vector from task 202. Preferably, task 204 results in a scalar value for each antenna beam. In an alternative embodiment discussed below, the LAC associated with the subscriber unit is used instead of the basis vector.

In task 206, the subscriber unit adds antenna beams to an antenna beam list when the associated scalar value is above a threshold. The threshold may be predetermined, it may be fixed for all antenna beams, or it may be varied depending on the specific antenna beam. For example, antenna beams directly below a satellite may have different thresholds than antenna beams having elongated shapes transmitted away from a satellite.

In task 208, the subscriber unit receives transmissions from satellites of the satellite communication system. In the preferred embodiment, the subscriber unit listens to broadcast channel information transmitted by the satellites. From information transmitted on the broadcast channel, the subscriber unit may determine the identity of the antenna beam for which the subscriber unit is receiving the broadcast channel. In one embodiment of the present invention, task 208 involves the subscriber unit looking for antenna beams on the list of antenna beams created in task 206.

In another embodiment of the present invention, task 208 includes the subscriber unit looking for broadcast channel transmissions from all satellites which it is able to receive such transmissions. In this embodiment, task 208 is performed prior to task 204 and 206. In this embodiment, task 204 includes performing a dot product of the beam vectors for which broadcast channel transmissions are received and the subscriber unit basis vector. Accordingly, only beams for which broadcast channel transmissions are received and those that are above the threshold are added to the beam list in task 206.

In task 210, the subscriber unit determines whether or not any of the received broadcast channel transmissions are associated with antenna beams on the antenna beam list. If no antenna beams are on the beam list, task 212 is performed in which the subscriber unit re-registers with the communications system. The re-registration process includes subscriber unit transmitting a re-registration request to the communication system. As a result of the re-registration process, the subscriber unit receives a new basis vector which is stored in the subscriber unit and stored in the gateway.

In the preferred embodiment, the re-registration process includes the subscriber unit performing a geolocation. However, in alternative embodiments, the subscriber unit's location may be identified from the antenna beam in which the subscriber unit's request for re-registration is received.

Once the re-registration process is complete and the subscriber unit and the gateway have a new basis vector for the subscriber unit, the subscriber unit re-performs tasks 202–210 using the new subscriber unit basis vector. Typically, right after the re-registration process is performed, there are antenna beams available to the subscriber unit that are on the antenna beam list generated in task 206. When there are antenna beams on the antenna beam list, the subscriber unit performs task 214.

In task 214, the subscriber unit listens for ring alerts transmitted to the subscriber unit on the antenna beams on the antenna beam list. The performance of task 214 may be viewed as a subscriber unit listening for incoming calls or pages. In the preferred embodiment, task 214 is performed by the subscriber unit for a predetermined period of time. After such predetermined period of time, the subscriber unit performs task 216, in which tasks 202–214 are repeated.

Figure 3:
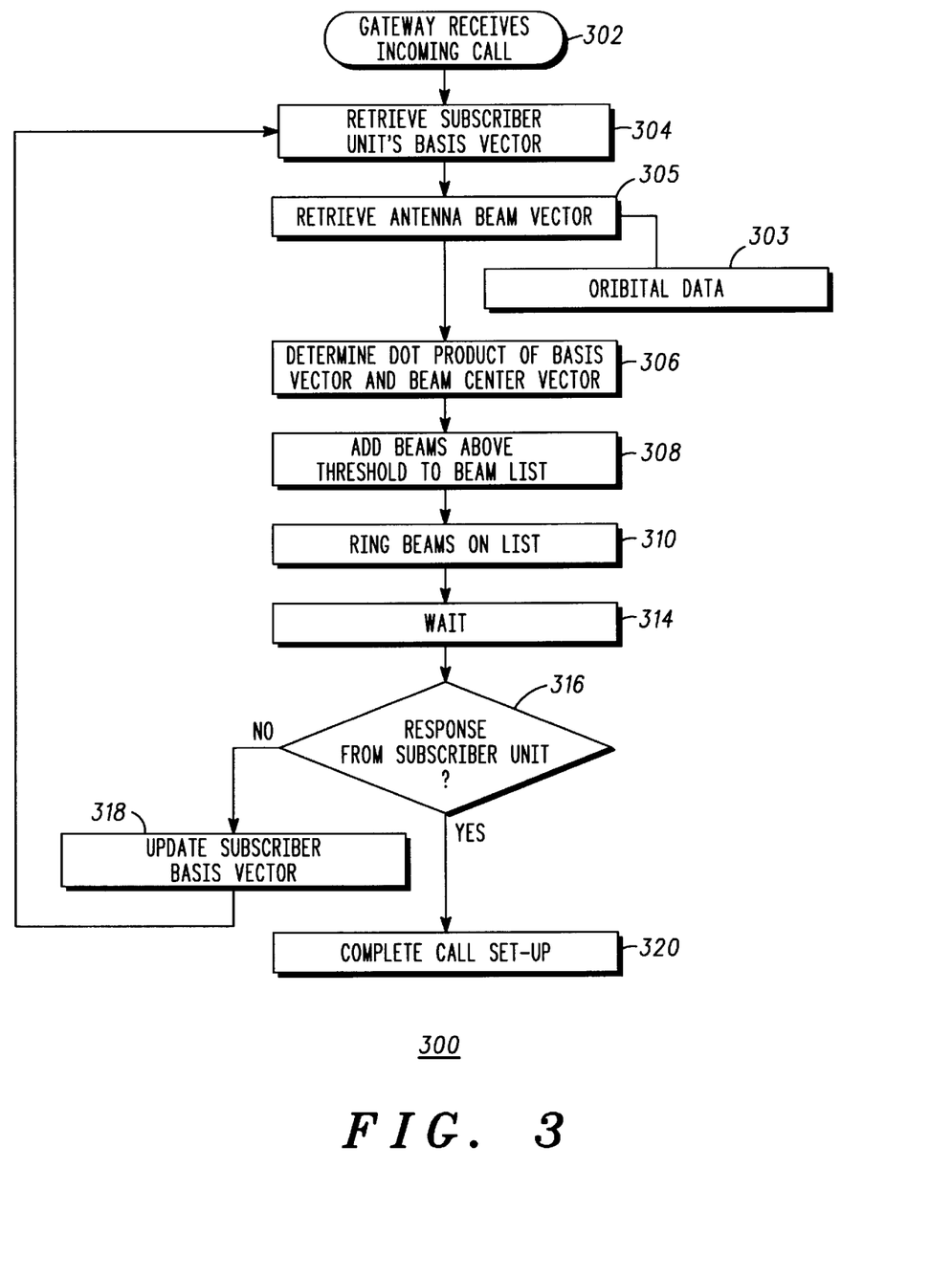
FIG. 3 illustrates a flow chart of a procedure performed by a gateway for identifying antenna beams for transmission of ring alerts to a subscriber unit in accordance with a preferred embodiment of the present invention.

Accordingly, when a subscriber unit moves its location, the periodic repeating of tasks 202–214 causes the subscriber unit to change the antenna beams for which it is listening for ring alerts. As discussed below, in accordance with procedure 300, the communication system preferably only broadcasts ring alerts for that subscriber unit on the antenna beams of the antenna beam list that the subscriber unit has generated. As a result, the communication system does not have to transmit ring alerts on an excess amount of antenna beams.

FIG. 3 illustrates a flowchart of a procedure performed by a gateway for identifying antenna beams for transmission of ring alerts to a subscriber unit in accordance with a preferred embodiment of the present invention. Preferably procedure 300 is performed by gateway 22 (FIG. 1).

In task 302, a gateway receives an incoming call for a particular subscriber unit. In this task, the gateway may alternatively receive an incoming page intended for a particular subscriber unit.

In task 304, the gateway retrieves the subscriber unit's basis vector in a database accessible to the gateway. In one embodiment, the basis vector identifies a LAC that was identified during the registration process for the subscriber unit. Alternatively, the basis vector identifies, among other things, the geographic location that the subscriber unit was at when it re-registered with the system. The location information in the basis vector may preferably be in an Earth centered Earth fixed coordinate system, however other coordinate systems are suitable.

In task 305, the gateway retrieves antenna beam vectors, preferably for each satellite antenna beam in the communication system. In a preferred embodiment, the gateway uses orbital information 303 about the satellites to determine their proper coordinates and vectors for the antenna beams.

In task 306, the gateway combines the subscriber units position information with the antenna beam information to arrive at a value for each antenna beam. In the preferred embodiment, the gateway performs a dot product of the subscriber units basis vector and antenna beam vector of the antenna beams transmitted by satellites of the system. The antenna beam vectors are preferably not fixed for each antenna beam when the satellites are moving over the surface of the Earth. Accordingly, each antenna beam vector has a time window associated with it for which that antenna beam vector is valid.

In one embodiment, the antenna beam vector represent a beam center of the antenna beam and is in an Earth centered Earth fixed coordinate system. Alternatively, the antenna beam vectors are bore site vectors from the satellite and are in a satellite centered coordinate system. The performance of task 306 preferably results in a scalar value for each antenna beam of the communication system.

In an alternative embodiment discussed below, the LAC associated with the subscriber unit is used in task 306 instead of the basis vector.

In task 308 the scalar values from task 306 that are above a threshold are added to an antenna beam list calculated by the gateway. As a result of task 308, the gateway has a list of antenna beams for which ring alerts to the subscriber unit are preferably transmitted. In the preferred embodiment, different thresholds are set for different antenna beams. For example, the thresholds for a particular antenna beam may be different for different location area codes, or thresholds may be different for different relative bore sites with respect to the satellites.

In task 310, the gateway sends the ring alert for transmission on the antenna beams on the antenna beam list generated in task 308. The satellites that are currently broadcasting those antenna beams transmit the ring alert. In task 314 the gateway waits for a response from the subscriber unit, preferably for a predetermined period of time.

In task 316, if no response is received from the subscriber unit, the subscriber unit may not be located within any of the antenna beams for which the ring alert was transmitted. In this case, task 318 is performed.

In task 318, the basis vector for the subscriber unit is updated. In one embodiment, the gateway waits for the subscriber unit to register with the system wherein the basis vector is updated.

In an alternative (non-preferred) embodiment, the subscriber unit is sent a message requesting the subscriber unit to update its basis vector preferably by re-registering with the system. The gateway may, for example, transmits a re-registration request on selected antenna beams within the communication system. This request may also be transmitted on all antenna beams of communication system 10 (FIG. 1).

In a preferred embodiment of the present invention, after task 314 waits a predetermined period of time for a response from the subscriber unit, task 310 may be re-performed, and a second ring alert is transmitted to the subscriber unit in the antenna beams of the beam list. In this embodiment, the subscriber unit has a second opportunity to receive ring alerts with antenna beams on the list in case for some reason it did not receive the ring alert the first time task 310 was performed.

In task 316, when the gateway does receive a response from the subscriber unit, task 320 is performed. In task 320, the gateway and the subscriber unit engage in a call setup procedure within the antenna beam which the subscriber unit responded. Upon completion of the call setup procedure, the subscriber unit engages in the communication with the calling party. In the case where the ring alert is a page intended for the subscriber unit, tasks 314–320 may not be performed. However, when the subscriber unit functions as a two-way pager, tasks 314–320 may be performed.

An example of using the non-positional information in the basis vector is provided for further understanding of one of the preferred embodiments of the present invention. In general, the information in the basis vector is used by both the gateway and the subscriber unit to arrive at a the beam list upon which a ring-alert is sent. Using "frequency information" for example: assume that both the antenna beam vector and the subscriber unit basis vector contain a component which defines frequency, in addition to location information. This component is preferably compared (either as a separate direct comparison or as part of an extended vector dot-product) to further refine the beam list which otherwise, would have been selected based on location data only. This is applied to any component (coding, time tags, etc.) which is defined for both vectors.

For a non-location based example, a communications system provides multiple communications "beams", each of which cover the entire service region (i.e., all beams cover all locations). Location does not affect the "beam" computation in such a system. Each beam has a vector defining frequency and time slot. The mobile subscriber units in this example also have a basis vector (also known to the Gateway, as of the last registration) which defines their current frequency and time slot parameters. Using a "dot product" of the available beam vectors and the mobile unit basis vector, both the Gateway and the mobile unit arrive at lists of "candidate beams". If the mobile unit cannot "hear" any of the beams on its list, maybe the Gateway has recently changed the frequency of its ring-alert beams or has switched to an alternate time slot or slots, or maybe the mobile has selected a new frequency based on local interference conditions, for whatever reason, no identified beam can be detected by the mobile, it will automatically initiate a system "re-registration" which will synchronize the basis vector information between the mobile and Gateway. The present invention also extends this concept to include other basis information as desired, such as coding for example.

In an alternative embodiment of the present invention, referred to as the location area code (LAC) embodiment, an input a message contains the location of the subscriber on the surface of the earth. The subscriber's location is in the form of a LAC, which is an area on the surface of the earth. It responds with the set of beams which intersect the ring alert area, (e.g., those beams required to ring alert the subscriber). To compute the beam list the apparatus uses the orbital elements of each of the satellites, data to describe the satellite antenna beams, and one or more time values at which the message is sent to the satellite.

Each time value is relative to the time that the apparatus received the message. For example, if two time values of 1.0 and 2.0 seconds are received, the apparatus computes the beams that ring alert the user at a time of T+1.0 and T+2.0, where T is the time that the message was received.

The Ring Alert apparatus computes the minimum set of beams that intersect the area that the subscriber unit is located in. This area, which will be referred to as the ring alert area, includes the LAC that the subscriber unit is in, and the distance that the subscriber unit is allowed to move, plus the error in the subscriber unit's location estimation algorithm.

The ring alert capacity of the system may be improved by computing the set of satellite beams to illuminate the ring alert area. However, the goal of improving ring alert capacity is offset by time required to compute the beam list. Allowing complex and arbitrary shapes for both the antenna beam patterns and the LAC shapes results in a time consuming process for computing the beam list, and require an excess amount of computers to respond to many ring alert requests per second. To reduce the computation time the system model is simplified in two ways. The first simplification arises from observing that the requirement for irregularly shaped LACs is for billing purposes (so that the Service Control Area can be computed given the LAC). Irregularly shaped LACs serve no purpose in the ring alert apparatus. For purposes of ring alert, the shapes are preferably considered as circles. The center and radius of the circle for each LAC is stored in a separate table.

The second simplification is that the satellite beam shapes are approximated by circular cones with their vertex at the satellite. The circular cone beam antenna model consists of a vector for each beam in the antenna array, and for each vector an associated beam angle. All vectors are preferably defined in the roll/pitch/yaw (rpy) coordinate frame of the satellite. The boresight vector and its associated beam angle are an approximation of a constant link margin contour for the communication link between the subscriber unit and the satellite. The value of link margin to be used for this contour is the value that is deemed sufficient to close the link with sufficient reliability.

Two other options for the antenna models have been implemented and tested. In one option, circular cones centered at the earth center are used. This produces circles for the antenna contours on the surface of the earth rather than ellipses.

The last option may used be if the circular cone models (either earth centered or satellite centered) just described are not accurate enough to provide sufficiently improved ring alert capacity. For this option, the boresight angle is given, but instead of a single beam width for each beam, an array of beam widths is given. This array describes the beam contour by giving the beam elevation angle as a function of azimuth angle. This method increases the time required to compute the beam list by approximately 50%, and also increases the amount of data that is required to describe the beams. One advantage is that a smaller number of beams will be computed due to the increased accuracy of the beam contour data.

The Ring Alert apparatus computes a ring alert message to be sent to the satellite. It reduces the number of satellites that must be considered by finding the orbital planes closest to the subscriber unit's zenith. For typical size ring alert areas, this results in reducing the number of planes from six to one or two. It also computes a position of each of the satellites computed above. The position is computed for time Tra. Tra is the current time plus DT, where DT is an estimate of how long before the ring alert message will be transmitted by the satellite. Since in the preferred embodiment, this message is only sent once every 4.32 seconds, there is an error in Tra of at most ±2.15 seconds. The position is computed as follows. If the time since the last time the position was computed for a satellite is less than DT (where DT is the time between ring alert transmissions), then propagate using a simple propagator.

It also computes which of the satellites composite beam pattern intersects with the Ring Alert area. For each beam of the satellites computed in above, it determines if the beam intersects the ring alert area. These steps may be repeated for another later time, and include the new beams computed in the beam list. This accounts for the unknown time of transmission of the ring alert message at the satellite.

Thus, an improved method of sending a ring alert to a subscriber unit has been described. Among other things, processing power is reduced and energy at the subscriber unit is conserved. Additionally, the number of registrations performed by a subscriber unit is reduced. Furthermore, the likelihood that the subscriber unit will receive the ring alert is increased.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. In a global satellite communication system comprised of communication satellites each providing a plurality of antenna beams moving with respect to earth's surface wherein each antenna beam having a beam vector associated therewith identifying a location of the antenna beam on earth's surface, a method of sending a ring alert to a subscriber unit comprising the steps of:

receiving an incoming call at a gateway;

said gateway retrieving a basis vector for said subscriber unit, said basis vector having information about said subscriber unit including location information;

the gateway determining a first dot product between said basis vector and each of said beam vectors;

adding ones of said antenna beams to a first list of antenna beams when said dot product exceeds a threshold value; and transmitting a ring-alert for said incoming call to said subscriber unit, said ring-alert being transmitted within antenna beams on said first list in response to the receiving step, and wherein the method further comprises the steps of:

the subscriber unit retrieving the basis vector from a memory of the subscriber unit;

the subscriber unit determining a second dot product between said basis vector and each of said beam vectors;

the subscriber unit adding antenna beams of said plurality to a second list of antenna beams when said second dot product exceeds said threshold value; and the subscriber unit monitoring broadcast channels of an antenna beam on said second list for transmission of said ring-alert.

2. The method as claimed in claim 1 further comprising the step of the subscriber unit re-registering with the system when the subscriber unit is unable to receive the broadcast channels of the antenna beams on the second list, the subscriber unit having an updated basis vector associated therewith after performing the step of re-registering.

3. The method as claimed in claim 2 wherein each antenna beam of said plurality is associated with one of said communication satellites and has a relative position to other of said antenna beams, wherein the adding step, said threshold value is at least in part based on said relative position of said antenna beam.

4. The method as claimed in claim 2 wherein the adding step, said threshold value is based on said basis vector of said subscriber unit.

5. The method as claimed in claim 2 further comprising the steps of:
   said gateway waiting for a response to said ring-alert from said subscriber unit; and
   when a response is received from said unit subscriber unit within a predetermined period of time, performing call set-up steps with said subscriber unit for said incoming call.

6. The method as claimed in claim 2 wherein said gateway has said basis vector associated with said subscriber unit stored therein, and wherein said basis vector includes previous channel information.

7. The method as claimed in claim 1 wherein said basis vector is associated with a location area code on earth's surface.

8. The method as claimed in claim 1 wherein the determining step, said dot product is determined between said basis vector and said beam vectors for each antenna beam in said communication system.

9. The method as claimed in claim 1 wherein said basis vector includes information identifying a region on earth's surface.

10. The method as claimed in claim 2 further comprising the step of said gateway waiting for a response to said ring-alert from said subscriber unit; and
   when no response is received from said subscriber unit within a predetermined period of time, waiting for said subscriber unit to re-register with said communication system.

11. In a global satellite communication system comprised of communication satellites each providing a plurality of antenna beams moving with respect to earth's surface wherein each antenna beam has a beam vector associated therewith identifying current a location of the antenna beam on earth's surface, said beam vectors being correlating with current orbital positions of the communication satellites, a method of determining antenna beams from which to receive a ring-alert comprising the steps of:
   retrieving a basis vector from a memory of a subscriber unit, said basis vector having location information about subscriber unit;
   the subscriber unit determining current beam vectors for the antenna beams based on orbital data stored in the subscriber unit;
   the subscriber unit determining a dot product between said basis vector and each of said current beam vectors;
   the subscriber unit maintaining a list of antenna beams as the beam vectors change for different orbital positions of the satellites by adding antenna beams of said plurality to the list when said dot product exceeds a threshold value and removing antenna beams from the list when the dot product does not exceed the threshold value;
   the subscriber unit monitoring broadcast channels of the antenna beams on said list for receipt of the ring-alert directed for the subscriber unit;
   the subscriber unit refraining from monitoring the broadcast channels of antenna beams of the plurality not on said list;
   the subscriber unit repeating the determining current beam vectors step and the determining the dot product step to perform the maintaining step as the orbital positions of the satellites change;
   registering with the communication system when the subscriber unit is unable to receive the broadcast channels from the antenna beams on the list, the subscriber receiving a updated basis vector in response to the registration step; and
   repeating the determining current beam vectors step and the determining the dot product step, the maintaining step, the monitoring step and the refraining step using the updated basis vector.

12. In a global satellite communication system comprised of communication satellites each providing a plurality of antenna beams moving with respect to earth's surface wherein each antenna beam having a beam vector associated therewith identifying a location of the antenna beam on earth's surface, a method of receiving a ring-alert comprising the steps of:
   retrieving a basis vector from a memory of a subscriber unit, said basis vector having information about subscriber unit;
   determining a dot product between said basis vector and each of said beam vectors;
   adding antenna beams of said plurality to a list of antenna beams when said dot product exceeds a threshold value;
   monitoring broadcast channels of an antenna beam on said list;
   determining available of said antenna beams of said plurality by looking for broadcast channels transmitted by said communication satellites; and
   registering, the registering step comprising the steps of:
      said subscriber unit transmitting a registration request to said communication system;
      receiving an updated basis vector;
      storing said updated basis vector in said memory; and
      performing the steps of retrieving, determining adding and monitoring with said updated basis vector, wherein said communication system includes a gateway for processing telephone calls, and wherein the method further comprises the steps of:
         said gateway receiving an incoming call for said subscriber unit;
         said gateway retrieving said basis vector for said subscriber unit;
         said gateway determining a second dot product between said basis vector and said current beam vectors;
         said gateway determining a gateway list of antenna beams when said second dot product exceeds the threshold value; and
         said gateway causing satellites to transmit said ring-alert for said incoming call to said subscriber unit, said ring-alert being transmitted within antenna beams on said gateway list in response to the receiving step.

13. The method as claimed in claim 12, further comprising the steps of:
   said subscriber unit sending a response to said gateway waiting in response to said ring-alert from said gateway; said
   when said response is received at said gateway from said subscriber unit within a predetermined period of time, said subscriber unit performing call set-up steps with said gateway for said incoming calls.

14. The method as claimed in claim 12 wherein the said gateway determining step, said second dot product is determined between said basis vector and said beam vectors for each antenna beam in said communication system.

15. The method as claimed in claim 12 further comprising the steps of:

said gateway waiting for a response to said ring-alert from said subscriber unit; and when no response is received from said subscriber unit within a predetermined period of time, waiting for said subscriber to re-register with said communication system, said gateway updating said basis vector with updated position information in said gateway after said subscriber unit completes the step of re-registering.

16. The method as claimed in claim 12 further comprising the steps of:

said gateway waiting for a response to said ring-alert from said subscriber unit;

when no response is received from said subscriber unit within a predetermined period of time, requesting said subscriber unit re-register with said communication system;

transmitting a message to said subscriber unit within antenna beams not on said list, said message informing the subscriber unit to re-register with said communication system, said subscriber unit performing the registering step in response to said message; and updating said basis vector with an updated position in said gateway after said subscriber unit completes the step of re-registering.

17. The method as claimed in claim 16 wherein the said gateway adding step, antenna beams are added to said gateway list of antenna beams when said second dot product exceeds the threshold value, wherein the threshold value is predetermined.

18. The method as claimed in claim 17 wherein each antenna beam of said plurality is associated with one of said satellites and has a relative position to other of said antenna beams, wherein the said gateway adding step, said threshold value is at least in part based on said relative position of said antenna beam.

19. The method as claimed in claim 18 wherein the said gateway adding step, said threshold value is based on said basis vector of said subscriber unit.

20. In a satellite communication system comprised of communication satellites each providing a plurality of antenna beams, each antenna beam having a beam vector associated therewith, each beam vector including a component representing available channel information, a method of determining antenna beams in which to send a ring-alert to a subscriber unit comprising the steps of:

a gateway retrieving a basis vector for the subscriber unit, said basis vector comprising prior channel information for the subscriber unit;

a gateway performing a dot product between the basis vector and each beam vector to produce a beam value for each antenna beam; and a gateway determining antenna beams of said plurality for transmitting the ring-alert to said subscriber unit based on said beam value, whereby correlation between the available channel information and the prior channel information result in a higher beam value for certain antenna beams thereby increasing the probability that the ring-alert will be transmitted within said certain antenna beams.

21. A method as claimed in claim 20 wherein the basis vector for the subscriber unit comprises location information for the subscriber unit and the prior channel information includes frequency information.

22. A method as claimed in claim 20 wherein the plurality of antenna beams are substantially overlapping and wherein the basis vector for the subscriber unit comprises prior frequency and time-slot information for the subscriber unit, and wherein the beam vectors comprise frequency and time-slot information for the associated antenna beam.

23. A method as claimed in claim 20 wherein the subscriber unit communicates over code division multiple access (CDMA) channels and wherein the plurality of antenna beams are substantially overlapping and wherein the basis vector for the subscriber unit comprises channel coding information, and wherein the beam vectors comprise channel coding information for the associated antenna beam.

* * * * *